US012796694B2

(12) United States Patent
Huang et al.

(10) Patent No.: US 12,796,694 B2
(45) **Date of Patent: *Nov. 17, 2026**

(54) METHOD FOR PROMOTING THE GROWTH OF COTTON UNDER LOW TEMPERATURE STRESS

(71) Applicant: CH Biotech R&D Co., Ltd., Nantou City (TW)

(72) Inventors: Jenn Wen Huang, Taichung (TW); Yi-Chiao Chan, Keelung (TW); Yu-Yi Wu, Taichung (TW); Nai-Hua Ye, Changhua (TW)

(73) Assignee: CH Biotech R&D Co., Ltd., Nantou City (TW)

( * ) Notice: Subject to any disclaimer, the term of this patent is extended or adjusted under 35 U.S.C. 154(b) by 215 days.

This patent is subject to a terminal disclaimer.

(21) Appl. No.: 18/758,198

(22) Filed: Jun. 28, 2024

(65) Prior Publication Data

US 2025/0212893 A1 Jul. 3, 2025

(30) Foreign Application Priority Data

Dec. 29, 2023 (TW) ................................ 112151694

(51) Int. Cl.
*A01N 63/50* (2020.01)
*A01P 21/00* (2006.01)

(52) U.S. Cl.
CPC .............. *A01N 63/50* (2020.01); *A01P 21/00* (2021.08)

(58) Field of Classification Search
None
See application file for complete search history.

(56) References Cited

FOREIGN PATENT DOCUMENTS

| | | | |
|---|---|---|---|
| WO | WO 2016/054310 | * | 4/2016 |
| WO | WO 2023/001946 | * | 1/2023 |

* cited by examiner

*Primary Examiner* — Genevieve S Alley
(74) *Attorney, Agent, or Firm* — Jen-Feng Lee, Esq.

(57) ABSTRACT

Present invention teaches the method of using a keratin hydrolyzed peptide ("KHP") solution to improve the growth of cotton under low temperature conditions. By selectively choosing specific weights of feathers and water, and treating the mixture to a high-temperature high-pressure hydrolysis process, the resulting solution is confirmed to contain at least 253 peptides and then infused to the soil containing the cotton seeds, the solution can also be sprayed to the leaf surface of cotton plants at a specific growth stage. Optionally, the KHP solution can be diluted by water, as disclosed in the specification, for applying to the soil and for spraying to leaf surface of cotton seedlings/plants.

8 Claims, 5 Drawing Sheets

Specification includes a Sequence Listing.

SEQUENCE LISTING

```
Sequence total quantity: 253
SEQ ID NO: 1             moltype = AA  length = 6
FEATURE                  Location/Qualifiers
source                   1..6
                         mol_type = protein
                         organism = Gallus gallus
SEQUENCE: 1
FGLSGL                                                                6

SEQ ID NO: 2             moltype = AA  length = 7
FEATURE                  Location/Qualifiers
source                   1..7
                         mol_type = protein
                         organism = Gallus gallus
SEQUENCE: 2
AAVGSSL                                                               7

SEQ ID NO: 3             moltype = AA  length = 7
FEATURE                  Location/Qualifiers
source                   1..7
                         mol_type = protein
                         organism = Gallus gallus
SEQUENCE: 3
TAVGSST                                                               7

SEQ ID NO: 4             moltype = AA  length = 6
FEATURE                  Location/Qualifiers
source                   1..6
                         mol_type = protein
                         organism = Gallus gallus
SEQUENCE: 4
LSLSSQ                                                                6

SEQ ID NO: 5             moltype = AA  length = 7
FEATURE                  Location/Qualifiers
source                   1..7
                         mol_type = protein
                         organism = Gallus gallus
SEQUENCE: 5
FGISGLG                                                               7
```

-continued

```
SEQ ID NO: 6            moltype = AA  length = 6
FEATURE                 Location/Qualifiers
source                  1..6
                        mol_type = protein
                        organism = Gallus gallus
SEQUENCE: 6
PILSSF                                                            6

SEQ ID NO: 7            moltype = AA  length = 7
FEATURE                 Location/Qualifiers
source                  1..7
                        mol_type = protein
                        organism = Gallus gallus
SEQUENCE: 7
SLLSQGA                                                           7

SEQ ID NO: 8            moltype = AA  length = 6
FEATURE                 Location/Qualifiers
source                  1..6
                        mol_type = protein
                        organism = Gallus gallus
SEQUENCE: 8
FNLRGA                                                            6

SEQ ID NO: 9            moltype = AA  length = 8
FEATURE                 Location/Qualifiers
source                  1..8
                        mol_type = protein
                        organism = Gallus gallus
SEQUENCE: 9
SAAVGSSL                                                          8

SEQ ID NO: 10           moltype = AA  length = 6
FEATURE                 Location/Qualifiers
source                  1..6
                        mol_type = protein
                        organism = Gallus gallus
SEQUENCE: 10
SRVVIQ                                                            6

SEQ ID NO: 11           moltype = AA  length = 6
FEATURE                 Location/Qualifiers
source                  1..6
                        mol_type = protein
                        organism = Gallus gallus
SEQUENCE: 11
SRVVLE                                                            6

SEQ ID NO: 12           moltype = AA  length = 8
FEATURE                 Location/Qualifiers
source                  1..8
                        mol_type = protein
                        organism = Gallus gallus
SEQUENCE: 12
GFGISGLG                                                          8

SEQ ID NO: 13           moltype = AA  length = 6
FEATURE                 Location/Qualifiers
source                  1..6
                        mol_type = protein
                        organism = Gallus gallus
SEQUENCE: 13
SRFSGR                                                            6

SEQ ID NO: 14           moltype = AA  length = 6
FEATURE                 Location/Qualifiers
source                  1..6
                        mol_type = protein
                        organism = Gallus gallus
SEQUENCE: 14
RVVIQP                                                            6

SEQ ID NO: 15           moltype = AA  length = 8
FEATURE                 Location/Qualifiers
source                  1..8
                        mol_type = protein
                        organism = Gallus gallus
SEQUENCE: 15
SAAVGSIL                                                          8
```

```
SEQ ID NO: 16           moltype = AA  length = 7
FEATURE                 Location/Qualifiers
source                  1..7
                        mol_type = protein
                        organism = Gallus gallus
SEQUENCE: 16
IVVIGHV                                                                  7

SEQ ID NO: 17           moltype = AA  length = 9
FEATURE                 Location/Qualifiers
source                  1..9
                        mol_type = protein
                        organism = Gallus gallus
SEQUENCE: 17
TAVGSSTSA                                                                9

SEQ ID NO: 18           moltype = AA  length = 7
FEATURE                 Location/Qualifiers
source                  1..7
                        mol_type = protein
                        organism = Gallus gallus
SEQUENCE: 18
RVVIQPS                                                                  7

SEQ ID NO: 19           moltype = AA  length = 7
FEATURE                 Location/Qualifiers
source                  1..7
                        mol_type = protein
                        organism = Gallus gallus
SEQUENCE: 19
SRVVIQP                                                                  7

SEQ ID NO: 20           moltype = AA  length = 7
FEATURE                 Location/Qualifiers
source                  1..7
                        mol_type = protein
                        organism = Gallus gallus
SEQUENCE: 20
PQGEQLQ                                                                  7

SEQ ID NO: 21           moltype = AA  length = 9
FEATURE                 Location/Qualifiers
source                  1..9
                        mol_type = protein
                        organism = Gallus gallus
SEQUENCE: 21
RAGAGPPSP                                                                9

SEQ ID NO: 22           moltype = AA  length = 7
FEATURE                 Location/Qualifiers
source                  1..7
                        mol_type = protein
                        organism = Gallus gallus
SEQUENCE: 22
DSRVVIQ                                                                  7

SEQ ID NO: 23           moltype = AA  length = 8
FEATURE                 Location/Qualifiers
source                  1..8
                        mol_type = protein
                        organism = Gallus gallus
SEQUENCE: 23
PGPILSSF                                                                 8

SEQ ID NO: 24           moltype = AA  length = 9
FEATURE                 Location/Qualifiers
source                  1..9
                        mol_type = protein
                        organism = Gallus gallus
SEQUENCE: 24
PISSGGFGI                                                                9

SEQ ID NO: 25           moltype = AA  length = 8
FEATURE                 Location/Qualifiers
source                  1..8
                        mol_type = protein
                        organism = Gallus gallus
SEQUENCE: 25
```

```
ISGLGSRF                                                      8

SEQ ID NO: 26          moltype = AA  length = 10
FEATURE                Location/Qualifiers
source                 1..10
                       mol_type = protein
                       organism = Gallus gallus
SEQUENCE: 26
SGGFGISGLG                                                    10

SEQ ID NO: 27          moltype = AA  length = 7
FEATURE                Location/Qualifiers
source                 1..7
                       mol_type = protein
                       organism = Gallus gallus
SEQUENCE: 27
SRFSGRR                                                       7

SEQ ID NO: 28          moltype = AA  length = 9
FEATURE                Location/Qualifiers
source                 1..9
                       mol_type = protein
                       organism = Gallus gallus
SEQUENCE: 28
PGLALPVLP                                                     9

SEQ ID NO: 29          moltype = AA  length = 8
FEATURE                Location/Qualifiers
source                 1..8
                       mol_type = protein
                       organism = Gallus gallus
SEQUENCE: 29
SRVVIQPS                                                      8

SEQ ID NO: 30          moltype = AA  length = 8
FEATURE                Location/Qualifiers
source                 1..8
                       mol_type = protein
                       organism = Gallus gallus
SEQUENCE: 30
PILSSFPQ                                                      8

SEQ ID NO: 31          moltype = AA  length = 8
FEATURE                Location/Qualifiers
source                 1..8
                       mol_type = protein
                       organism = Gallus gallus
SEQUENCE: 31
LGSGIFWI                                                      8

SEQ ID NO: 32          moltype = AA  length = 9
FEATURE                Location/Qualifiers
source                 1..9
                       mol_type = protein
                       organism = Gallus gallus
SEQUENCE: 32
GISGLGSRF                                                     9

SEQ ID NO: 33          moltype = AA  length = 9
FEATURE                Location/Qualifiers
source                 1..9
                       mol_type = protein
                       organism = Gallus gallus
SEQUENCE: 33
VVVTLPGPI                                                     9

SEQ ID NO: 34          moltype = AA  length = 8
FEATURE                Location/Qualifiers
source                 1..8
                       mol_type = protein
                       organism = Gallus gallus
SEQUENCE: 34
CRLSLSQP                                                      8

SEQ ID NO: 35          moltype = AA  length = 11
FEATURE                Location/Qualifiers
source                 1..11
                       mol_type = protein
                       organism = Gallus gallus
```

-continued

```
SEQUENCE: 35
SAAVGSSLSA G                                                        11

SEQ ID NO: 36           moltype = AA  length = 11
FEATURE                 Location/Qualifiers
source                  1..11
                        mol_type = protein
                        organism = Gallus gallus
SEQUENCE: 36
AVGSSTSAAV G                                                        11

SEQ ID NO: 37           moltype = AA  length = 9
FEATURE                 Location/Qualifiers
source                  1..9
                        mol_type = protein
                        organism = Gallus gallus
SEQUENCE: 37
VVTLPGPIL                                                           9

SEQ ID NO: 38           moltype = AA  length = 9
FEATURE                 Location/Qualifiers
source                  1..9
                        mol_type = protein
                        organism = Gallus gallus
SEQUENCE: 38
PGPILSSFP                                                           9

SEQ ID NO: 39           moltype = AA  length = 10
FEATURE                 Location/Qualifiers
source                  1..10
                        mol_type = protein
                        organism = Gallus gallus
SEQUENCE: 39
SAAVGSILSE                                                          10

SEQ ID NO: 40           moltype = AA  length = 10
FEATURE                 Location/Qualifiers
source                  1..10
                        mol_type = protein
                        organism = Gallus gallus
SEQUENCE: 40
VPISSGGFGI                                                          10

SEQ ID NO: 41           moltype = AA  length = 8
FEATURE                 Location/Qualifiers
source                  1..8
                        mol_type = protein
                        organism = Gallus gallus
SEQUENCE: 41
QLAQRNTI                                                            8

SEQ ID NO: 42           moltype = AA  length = 9
FEATURE                 Location/Qualifiers
source                  1..9
                        mol_type = protein
                        organism = Gallus gallus
SEQUENCE: 42
LSGLRSNLS                                                           9

SEQ ID NO: 43           moltype = AA  length = 10
FEATURE                 Location/Qualifiers
source                  1..10
                        mol_type = protein
                        organism = Gallus gallus
SEQUENCE: 43
PSPVVVTLPG                                                          10

SEQ ID NO: 44           moltype = AA  length = 10
FEATURE                 Location/Qualifiers
source                  1..10
                        mol_type = protein
                        organism = Gallus gallus
SEQUENCE: 44
PPPVVVTLPG                                                          10

SEQ ID NO: 45           moltype = AA  length = 10
FEATURE                 Location/Qualifiers
source                  1..10
                        mol_type = protein
```

```
                        organism = Gallus gallus
SEQUENCE: 45
ISGLGSRFSG                                                      10

SEQ ID NO: 46           moltype = AA  length = 9
FEATURE                 Location/Qualifiers
source                  1..9
                        mol_type = protein
                        organism = Gallus gallus
SEQUENCE: 46
LALRQSVEA                                                       9

SEQ ID NO: 47           moltype = AA  length = 10
FEATURE                 Location/Qualifiers
source                  1..10
                        mol_type = protein
                        organism = Gallus gallus
SEQUENCE: 47
PLLGPPLLGI                                                      10

SEQ ID NO: 48           moltype = AA  length = 10
FEATURE                 Location/Qualifiers
source                  1..10
                        mol_type = protein
                        organism = Gallus gallus
SEQUENCE: 48
VVTLPGPILS                                                      10

SEQ ID NO: 49           moltype = AA  length = 8
FEATURE                 Location/Qualifiers
source                  1..8
                        mol_type = protein
                        organism = Gallus gallus
SEQUENCE: 49
VTLEDLRR                                                        8

SEQ ID NO: 50           moltype = AA  length = 9
FEATURE                 Location/Qualifiers
source                  1..9
                        mol_type = protein
                        organism = Gallus gallus
SEQUENCE: 50
PILSSFPQN                                                       9

SEQ ID NO: 51           moltype = AA  length = 9
FEATURE                 Location/Qualifiers
source                  1..9
                        mol_type = protein
                        organism = Gallus gallus
SEQUENCE: 51
PILSSFPQD                                                       9

SEQ ID NO: 52           moltype = AA  length = 11
FEATURE                 Location/Qualifiers
source                  1..11
                        mol_type = protein
                        organism = Gallus gallus
SEQUENCE: 52
GTVGVSAGVT R                                                    11

SEQ ID NO: 53           moltype = AA  length = 9
FEATURE                 Location/Qualifiers
source                  1..9
                        mol_type = protein
                        organism = Gallus gallus
SEQUENCE: 53
FGLSRVTLN                                                       9

SEQ ID NO: 54           moltype = AA  length = 12
FEATURE                 Location/Qualifiers
source                  1..12
                        mol_type = protein
                        organism = Gallus gallus
SEQUENCE: 54
TAVGSSTSAA VG                                                   12

SEQ ID NO: 55           moltype = AA  length = 10
FEATURE                 Location/Qualifiers
source                  1..10
```

-continued

```
                          mol_type = protein
                          organism = Gallus gallus
SEQUENCE: 55
VVVTLPGPIL                                                                 10

SEQ ID NO: 56             moltype = AA  length = 10
FEATURE                   Location/Qualifiers
source                    1..10
                          mol_type = protein
                          organism = Gallus gallus
SEQUENCE: 56
PPVVVTFPGP                                                                 10

SEQ ID NO: 57             moltype = AA  length = 10
FEATURE                   Location/Qualifiers
source                    1..10
                          mol_type = protein
                          organism = Gallus gallus
SEQUENCE: 57
PPPVVVTFPG                                                                 10

SEQ ID NO: 58             moltype = AA  length = 10
FEATURE                   Location/Qualifiers
source                    1..10
                          mol_type = protein
                          organism = Gallus gallus
SEQUENCE: 58
VVIQPSPVVV                                                                 10

SEQ ID NO: 59             moltype = AA  length = 10
FEATURE                   Location/Qualifiers
source                    1..10
                          mol_type = protein
                          organism = Gallus gallus
SEQUENCE: 59
FGISGLGSRF                                                                 10

SEQ ID NO: 60             moltype = AA  length = 10
FEATURE                   Location/Qualifiers
source                    1..10
                          mol_type = protein
                          organism = Gallus gallus
SEQUENCE: 60
PGPILSSFPQ                                                                 10

SEQ ID NO: 61             moltype = AA  length = 10
FEATURE                   Location/Qualifiers
source                    1..10
                          mol_type = protein
                          organism = Gallus gallus
SEQUENCE: 61
FGWSGLGRGL                                                                 10

SEQ ID NO: 62             moltype = AA  length = 9
FEATURE                   Location/Qualifiers
source                    1..9
                          mol_type = protein
                          organism = Gallus gallus
SEQUENCE: 62
LEAQLSELR                                                                  9

SEQ ID NO: 63             moltype = AA  length = 9
FEATURE                   Location/Qualifiers
source                    1..9
                          mol_type = protein
                          organism = Gallus gallus
SEQUENCE: 63
IVGAWYTVR                                                                  9

SEQ ID NO: 64             moltype = AA  length = 11
FEATURE                   Location/Qualifiers
source                    1..11
                          mol_type = protein
                          organism = Gallus gallus
SEQUENCE: 64
LLSPPGLPGL L                                                               11

SEQ ID NO: 65             moltype = AA  length = 11
FEATURE                   Location/Qualifiers
```

```
source                  1..11
                        mol_type = protein
                        organism = Gallus gallus
SEQUENCE: 65
VVVTLPGPIL S                                                     11

SEQ ID NO: 66           moltype = AA  length = 11
FEATURE                 Location/Qualifiers
source                  1..11
                        mol_type = protein
                        organism = Gallus gallus
SEQUENCE: 66
GFGISGLGSR F                                                     11

SEQ ID NO: 67           moltype = AA  length = 11
FEATURE                 Location/Qualifiers
source                  1..11
                        mol_type = protein
                        organism = Gallus gallus
SEQUENCE: 67
PVVVTLPGPI L                                                     11

SEQ ID NO: 68           moltype = AA  length = 11
FEATURE                 Location/Qualifiers
source                  1..11
                        mol_type = protein
                        organism = Gallus gallus
SEQUENCE: 68
VSQGEITVPS I                                                     11

SEQ ID NO: 69           moltype = AA  length = 11
FEATURE                 Location/Qualifiers
source                  1..11
                        mol_type = protein
                        organism = Gallus gallus
SEQUENCE: 69
SILSEEGVPI S                                                     11

SEQ ID NO: 70           moltype = AA  length = 11
FEATURE                 Location/Qualifiers
source                  1..11
                        mol_type = protein
                        organism = Gallus gallus
SEQUENCE: 70
PVVVTFPGPI L                                                     11

SEQ ID NO: 71           moltype = AA  length = 13
FEATURE                 Location/Qualifiers
source                  1..13
                        mol_type = protein
                        organism = Gallus gallus
SEQUENCE: 71
PISSGGFGIS GLG                                                   13

SEQ ID NO: 72           moltype = AA  length = 13
FEATURE                 Location/Qualifiers
source                  1..13
                        mol_type = protein
                        organism = Gallus gallus
SEQUENCE: 72
VGSSTSAAVG SIL                                                   13

SEQ ID NO: 73           moltype = AA  length = 11
FEATURE                 Location/Qualifiers
source                  1..11
                        mol_type = protein
                        organism = Gallus gallus
SEQUENCE: 73
GFLSSAVSLN R                                                     11

SEQ ID NO: 74           moltype = AA  length = 12
FEATURE                 Location/Qualifiers
source                  1..12
                        mol_type = protein
                        organism = Gallus gallus
SEQUENCE: 74
GGFGISGLGS RF                                                    12

SEQ ID NO: 75           moltype = AA  length = 11
```

```
FEATURE                 Location/Qualifiers
source                  1..11
                        mol_type = protein
                        organism = Gallus gallus
SEQUENCE: 75
PGPILSSFPQ N                                                  11

SEQ ID NO: 76           moltype = AA  length = 11
FEATURE                 Location/Qualifiers
source                  1..11
                        mol_type = protein
                        organism = Gallus gallus
SEQUENCE: 76
PGPILSSFPQ D                                                  11

SEQ ID NO: 77           moltype = AA  length = 12
FEATURE                 Location/Qualifiers
source                  1..12
                        mol_type = protein
                        organism = Gallus gallus
SEQUENCE: 77
GGFGWSGLGR GL                                                 12

SEQ ID NO: 78           moltype = AA  length = 12
FEATURE                 Location/Qualifiers
source                  1..12
                        mol_type = protein
                        organism = Gallus gallus
SEQUENCE: 78
PSPVVVTLPG PI                                                 12

SEQ ID NO: 79           moltype = AA  length = 12
FEATURE                 Location/Qualifiers
source                  1..12
                        mol_type = protein
                        organism = Gallus gallus
SEQUENCE: 79
VVVTLPGPIL SS                                                 12

SEQ ID NO: 80           moltype = AA  length = 12
FEATURE                 Location/Qualifiers
source                  1..12
                        mol_type = protein
                        organism = Gallus gallus
SEQUENCE: 80
PVVVTLPGPI LS                                                 12

SEQ ID NO: 81           moltype = AA  length = 12
FEATURE                 Location/Qualifiers
source                  1..12
                        mol_type = protein
                        organism = Gallus gallus
SEQUENCE: 81
SPVVVTLPGP IL                                                 12

SEQ ID NO: 82           moltype = AA  length = 11
FEATURE                 Location/Qualifiers
source                  1..11
                        mol_type = protein
                        organism = Gallus gallus
SEQUENCE: 82
RVVIQPSPVV V                                                  11

SEQ ID NO: 83           moltype = AA  length = 11
FEATURE                 Location/Qualifiers
source                  1..11
                        mol_type = protein
                        organism = Gallus gallus
SEQUENCE: 83
QALTEVYAKA N                                                  11

SEQ ID NO: 84           moltype = AA  length = 10
FEATURE                 Location/Qualifiers
source                  1..10
                        mol_type = protein
                        organism = Gallus gallus
SEQUENCE: 84
IETLTQFLGW                                                    10
```

```
SEQ ID NO: 85            moltype = AA  length = 13
FEATURE                  Location/Qualifiers
source                   1..13
                         mol_type = protein
                         organism = Gallus gallus
SEQUENCE: 85
GFGSRSLVGL GGT                                                            13

SEQ ID NO: 86            moltype = AA  length = 14
FEATURE                  Location/Qualifiers
source                   1..14
                         mol_type = protein
                         organism = Gallus gallus
SEQUENCE: 86
AVGSSTSAAV GSIL                                                           14

SEQ ID NO: 87            moltype = AA  length = 12
FEATURE                  Location/Qualifiers
source                   1..12
                         mol_type = protein
                         organism = Gallus gallus
SEQUENCE: 87
PVVVTFPGPI LS                                                             12

SEQ ID NO: 88            moltype = AA  length = 14
FEATURE                  Location/Qualifiers
source                   1..14
                         mol_type = protein
                         organism = Gallus gallus
SEQUENCE: 88
VGSSTSAAVG SILS                                                           14

SEQ ID NO: 89            moltype = AA  length = 13
FEATURE                  Location/Qualifiers
source                   1..13
                         mol_type = protein
                         organism = Gallus gallus
SEQUENCE: 89
GFGISGLGSR FSG                                                            13

SEQ ID NO: 90            moltype = AA  length = 13
FEATURE                  Location/Qualifiers
source                   1..13
                         mol_type = protein
                         organism = Gallus gallus
SEQUENCE: 90
SGGFGISGLG SRF                                                            13

SEQ ID NO: 91            moltype = AA  length = 14
FEATURE                  Location/Qualifiers
source                   1..14
                         mol_type = protein
                         organism = Gallus gallus
SEQUENCE: 91
VPISSGGFGI SGLG                                                           14

SEQ ID NO: 92            moltype = AA  length = 12
FEATURE                  Location/Qualifiers
source                   1..12
                         mol_type = protein
                         organism = Gallus gallus
SEQUENCE: 92
VVIQPSPVVV TL                                                             12

SEQ ID NO: 93            moltype = AA  length = 13
FEATURE                  Location/Qualifiers
source                   1..13
                         mol_type = protein
                         organism = Gallus gallus
SEQUENCE: 93
SILSEEGVPI SSG                                                            13

SEQ ID NO: 94            moltype = AA  length = 13
FEATURE                  Location/Qualifiers
source                   1..13
                         mol_type = protein
                         organism = Gallus gallus
SEQUENCE: 94
VMGCKAAGAS RII                                                            13
```

```
SEQ ID NO: 95           moltype = AA  length = 13
FEATURE                 Location/Qualifiers
source                  1..13
                        mol_type = protein
                        organism = Gallus gallus
SEQUENCE: 95
SPVVVTLPGP ILS                                                             13

SEQ ID NO: 96           moltype = AA  length = 12
FEATURE                 Location/Qualifiers
source                  1..12
                        mol_type = protein
                        organism = Gallus gallus
SEQUENCE: 96
SRVVIQPSPV VV                                                              12

SEQ ID NO: 97           moltype = AA  length = 13
FEATURE                 Location/Qualifiers
source                  1..13
                        mol_type = protein
                        organism = Gallus gallus
SEQUENCE: 97
PSPVVVTLPG PIL                                                             13

SEQ ID NO: 98           moltype = AA  length = 12
FEATURE                 Location/Qualifiers
source                  1..12
                        mol_type = protein
                        organism = Gallus gallus
SEQUENCE: 98
RVVIQPSPVV VT                                                              12

SEQ ID NO: 99           moltype = AA  length = 13
FEATURE                 Location/Qualifiers
source                  1..13
                        mol_type = protein
                        organism = Gallus gallus
SEQUENCE: 99
PPPVVVTLPG PIL                                                             13

SEQ ID NO: 100          moltype = AA  length = 15
FEATURE                 Location/Qualifiers
source                  1..15
                        mol_type = protein
                        organism = Gallus gallus
SEQUENCE: 100
GVPISSGGFG ISGLG                                                           15

SEQ ID NO: 101          moltype = AA  length = 13
FEATURE                 Location/Qualifiers
source                  1..13
                        mol_type = protein
                        organism = Gallus gallus
SEQUENCE: 101
VIQPSPVVVT LPG                                                             13

SEQ ID NO: 102          moltype = AA  length = 15
FEATURE                 Location/Qualifiers
source                  1..15
                        mol_type = protein
                        organism = Gallus gallus
SEQUENCE: 102
AVGSSTSAAV GSILS                                                           15

SEQ ID NO: 103          moltype = AA  length = 15
FEATURE                 Location/Qualifiers
source                  1..15
                        mol_type = protein
                        organism = Gallus gallus
SEQUENCE: 103
TAVGSSTSAA VGSIL                                                           15

SEQ ID NO: 104          moltype = AA  length = 14
FEATURE                 Location/Qualifiers
source                  1..14
                        mol_type = protein
                        organism = Gallus gallus
SEQUENCE: 104
```

```
SGGFGISGLG SRFS                                                    14

SEQ ID NO: 105          moltype = AA  length = 13
FEATURE                 Location/Qualifiers
source                  1..13
                        mol_type = protein
                        organism = Gallus gallus
SEQUENCE: 105
VVVTLPGPIL SSF                                                     13

SEQ ID NO: 106          moltype = AA  length = 13
FEATURE                 Location/Qualifiers
source                  1..13
                        mol_type = protein
                        organism = Gallus gallus
SEQUENCE: 106
PPPVVVTFPG PIL                                                     13

SEQ ID NO: 107          moltype = AA  length = 14
FEATURE                 Location/Qualifiers
source                  1..14
                        mol_type = protein
                        organism = Gallus gallus
SEQUENCE: 107
GLGGFGWSGL GRGL                                                    14

SEQ ID NO: 108          moltype = AA  length = 13
FEATURE                 Location/Qualifiers
source                  1..13
                        mol_type = protein
                        organism = Gallus gallus
SEQUENCE: 108
VTLPGPILSS FPQ                                                     13

SEQ ID NO: 109          moltype = AA  length = 14
FEATURE                 Location/Qualifiers
source                  1..14
                        mol_type = protein
                        organism = Gallus gallus
SEQUENCE: 109
AVGSILSEEG VPIS                                                    14

SEQ ID NO: 110          moltype = AA  length = 14
FEATURE                 Location/Qualifiers
source                  1..14
                        mol_type = protein
                        organism = Gallus gallus
SEQUENCE: 110
SLGLGGFGWS GLGR                                                    14

SEQ ID NO: 111          moltype = AA  length = 14
FEATURE                 Location/Qualifiers
source                  1..14
                        mol_type = protein
                        organism = Gallus gallus
SEQUENCE: 111
PSPVVVTLPG PILS                                                    14

SEQ ID NO: 112          moltype = AA  length = 13
FEATURE                 Location/Qualifiers
source                  1..13
                        mol_type = protein
                        organism = Gallus gallus
SEQUENCE: 112
SRVVIQPSPV VVT                                                     13

SEQ ID NO: 113          moltype = AA  length = 15
FEATURE                 Location/Qualifiers
source                  1..15
                        mol_type = protein
                        organism = Gallus gallus
SEQUENCE: 113
SGGFGISGLG SRFSG                                                   15

SEQ ID NO: 114          moltype = AA  length = 14
FEATURE                 Location/Qualifiers
source                  1..14
                        mol_type = protein
                        organism = Gallus gallus
```

```
SEQUENCE: 114
PPPVVVTLPG PILS                                                     14

SEQ ID NO: 115         moltype = AA  length = 14
FEATURE                Location/Qualifiers
source                 1..14
                       mol_type = protein
                       organism = Gallus gallus
SEQUENCE: 115
VAIQPPPVVV TLPG                                                     14

SEQ ID NO: 116         moltype = AA  length = 15
FEATURE                Location/Qualifiers
source                 1..15
                       mol_type = protein
                       organism = Gallus gallus
SEQUENCE: 116
PISSGGFGIS GLGSR                                                    15

SEQ ID NO: 117         moltype = AA  length = 13
FEATURE                Location/Qualifiers
source                 1..13
                       mol_type = protein
                       organism = Gallus gallus
SEQUENCE: 117
PIVDVAEALL HVK                                                      13

SEQ ID NO: 118         moltype = AA  length = 14
FEATURE                Location/Qualifiers
source                 1..14
                       mol_type = protein
                       organism = Gallus gallus
SEQUENCE: 118
VVIQPSPVVV TLPG                                                     14

SEQ ID NO: 119         moltype = AA  length = 13
FEATURE                Location/Qualifiers
source                 1..13
                       mol_type = protein
                       organism = Gallus gallus
SEQUENCE: 119
RVVIQPSPVV VTL                                                      13

SEQ ID NO: 120         moltype = AA  length = 16
FEATURE                Location/Qualifiers
source                 1..16
                       mol_type = protein
                       organism = Gallus gallus
SEQUENCE: 120
TAVGSSTSAA VGSILS                                                   16

SEQ ID NO: 121         moltype = AA  length = 14
FEATURE                Location/Qualifiers
source                 1..14
                       mol_type = protein
                       organism = Gallus gallus
SEQUENCE: 121
PPPVVVTFPG PILS                                                     14

SEQ ID NO: 122         moltype = AA  length = 15
FEATURE                Location/Qualifiers
source                 1..15
                       mol_type = protein
                       organism = Gallus gallus
SEQUENCE: 122
SLGLGGFGWS GLGRG                                                    15

SEQ ID NO: 123         moltype = AA  length = 14
FEATURE                Location/Qualifiers
source                 1..14
                       mol_type = protein
                       organism = Gallus gallus
SEQUENCE: 123
VVVTLPGPIL SSFP                                                     14

SEQ ID NO: 124         moltype = AA  length = 14
FEATURE                Location/Qualifiers
source                 1..14
                       mol_type = protein
```

```
                        organism = Gallus gallus
SEQUENCE: 124
PVVVTLPGPI LSSF                                                  14

SEQ ID NO: 125          moltype = AA  length = 15
FEATURE                 Location/Qualifiers
source                  1..15
                        mol_type = protein
                        organism = Gallus gallus
SEQUENCE: 125
AAVGSILSEE GVPIS                                                 15

SEQ ID NO: 126          moltype = AA  length = 15
FEATURE                 Location/Qualifiers
source                  1..15
                        mol_type = protein
                        organism = Gallus gallus
SEQUENCE: 126
SAAVGSILSE EGVPI                                                 15

SEQ ID NO: 127          moltype = AA  length = 16
FEATURE                 Location/Qualifiers
source                  1..16
                        mol_type = protein
                        organism = Gallus gallus
SEQUENCE: 127
EGVPISSGGF GISGLG                                                16

SEQ ID NO: 128          moltype = AA  length = 14
FEATURE                 Location/Qualifiers
source                  1..14
                        mol_type = protein
                        organism = Gallus gallus
SEQUENCE: 128
VVTLPGPILS SFPQ                                                  14

SEQ ID NO: 129          moltype = AA  length = 15
FEATURE                 Location/Qualifiers
source                  1..15
                        mol_type = protein
                        organism = Gallus gallus
SEQUENCE: 129
PSPVVVTLPG PILSS                                                 15

SEQ ID NO: 130          moltype = AA  length = 16
FEATURE                 Location/Qualifiers
source                  1..16
                        mol_type = protein
                        organism = Gallus gallus
SEQUENCE: 130
GKDGPKGVRG DAGPPG                                                16

SEQ ID NO: 131          moltype = AA  length = 15
FEATURE                 Location/Qualifiers
source                  1..15
                        mol_type = protein
                        organism = Gallus gallus
SEQUENCE: 131
SVAIQPPPVV VTLPG                                                 15

SEQ ID NO: 132          moltype = AA  length = 14
FEATURE                 Location/Qualifiers
source                  1..14
                        mol_type = protein
                        organism = Gallus gallus
SEQUENCE: 132
SRVVIQPSPV VVTL                                                  14

SEQ ID NO: 133          moltype = AA  length = 14
FEATURE                 Location/Qualifiers
source                  1..14
                        mol_type = protein
                        organism = Gallus gallus
SEQUENCE: 133
LHTEAAATVP DRSE                                                  14

SEQ ID NO: 134          moltype = AA  length = 15
FEATURE                 Location/Qualifiers
source                  1..15
```

```
                        mol_type = protein
                        organism = Gallus gallus
SEQUENCE: 134
VVIQPSPVVV TLPGP                                                15

SEQ ID NO: 135          moltype = AA  length = 14
FEATURE                 Location/Qualifiers
source                  1..14
                        mol_type = protein
                        organism = Gallus gallus
SEQUENCE: 135
RVVIQPSPVV VTLP                                                 14

SEQ ID NO: 136          moltype = AA  length = 16
FEATURE                 Location/Qualifiers
source                  1..16
                        mol_type = protein
                        organism = Gallus gallus
SEQUENCE: 136
SAAVGSILSE EGVPIS                                               16

SEQ ID NO: 137          moltype = AA  length = 15
FEATURE                 Location/Qualifiers
source                  1..15
                        mol_type = protein
                        organism = Gallus gallus
SEQUENCE: 137
PVVVTLPGPI LSSFP                                                15

SEQ ID NO: 138          moltype = AA  length = 15
FEATURE                 Location/Qualifiers
source                  1..15
                        mol_type = protein
                        organism = Gallus gallus
SEQUENCE: 138
IQPSPVVVTL PGPIL                                                15

SEQ ID NO: 139          moltype = AA  length = 17
FEATURE                 Location/Qualifiers
source                  1..17
                        mol_type = protein
                        organism = Gallus gallus
SEQUENCE: 139
SVPIGAGGSL GLGGFGW                                              17

SEQ ID NO: 140          moltype = AA  length = 16
FEATURE                 Location/Qualifiers
source                  1..16
                        mol_type = protein
                        organism = Gallus gallus
SEQUENCE: 140
SLGLGGFGWS GLGRGL                                               16

SEQ ID NO: 141          moltype = AA  length = 17
FEATURE                 Location/Qualifiers
source                  1..17
                        mol_type = protein
                        organism = Gallus gallus
SEQUENCE: 141
FGGGFGGGDG ILPAGEK                                              17

SEQ ID NO: 142          moltype = AA  length = 17
FEATURE                 Location/Qualifiers
source                  1..17
                        mol_type = protein
                        organism = Gallus gallus
SEQUENCE: 142
TAVGSSTSAA VGSILSE                                              17

SEQ ID NO: 143          moltype = AA  length = 16
FEATURE                 Location/Qualifiers
source                  1..16
                        mol_type = protein
                        organism = Gallus gallus
SEQUENCE: 143
PISSGGFGIS GLGSRF                                               16

SEQ ID NO: 144          moltype = AA  length = 19
FEATURE                 Location/Qualifiers
```

```
source                  1..19
                        mol_type = protein
                        organism = Gallus gallus
SEQUENCE: 144
SAAVGSSLSA GSVPIGAGG                                             19

SEQ ID NO: 145          moltype = AA  length = 17
FEATURE                 Location/Qualifiers
source                  1..17
                        mol_type = protein
                        organism = Gallus gallus
SEQUENCE: 145
GVPISSGGFG ISGLGSR                                               17

SEQ ID NO: 146          moltype = AA  length = 15
FEATURE                 Location/Qualifiers
source                  1..15
                        mol_type = protein
                        organism = Gallus gallus
SEQUENCE: 146
VVVTLPGPIL SSFPQ                                                 15

SEQ ID NO: 147          moltype = AA  length = 15
FEATURE                 Location/Qualifiers
source                  1..15
                        mol_type = protein
                        organism = Gallus gallus
SEQUENCE: 147
RVVIQPSPVV VTLPG                                                 15

SEQ ID NO: 148          moltype = AA  length = 15
FEATURE                 Location/Qualifiers
source                  1..15
                        mol_type = protein
                        organism = Gallus gallus
SEQUENCE: 148
SRVVIQPSPV VVTLP                                                 15

SEQ ID NO: 149          moltype = AA  length = 16
FEATURE                 Location/Qualifiers
source                  1..16
                        mol_type = protein
                        organism = Gallus gallus
SEQUENCE: 149
PSPVVVTLPG PILSSF                                                16

SEQ ID NO: 150          moltype = AA  length = 16
FEATURE                 Location/Qualifiers
source                  1..16
                        mol_type = protein
                        organism = Gallus gallus
SEQUENCE: 150
AIQPPPVVVT LPGPIL                                                16

SEQ ID NO: 151          moltype = AA  length = 16
FEATURE                 Location/Qualifiers
source                  1..16
                        mol_type = protein
                        organism = Gallus gallus
SEQUENCE: 151
IQPSPVVVTL PGPILS                                                16

SEQ ID NO: 152          moltype = AA  length = 16
FEATURE                 Location/Qualifiers
source                  1..16
                        mol_type = protein
                        organism = Gallus gallus
SEQUENCE: 152
VIQPSPVVVT LPGPIL                                                16

SEQ ID NO: 153          moltype = AA  length = 17
FEATURE                 Location/Qualifiers
source                  1..17
                        mol_type = protein
                        organism = Gallus gallus
SEQUENCE: 153
VPISSGGFGI SGLGSRF                                               17

SEQ ID NO: 154          moltype = AA  length = 16
```

```
FEATURE                Location/Qualifiers
source                 1..16
                       mol_type = protein
                       organism = Gallus gallus
SEQUENCE: 154
SRVVIQPSPV VVTLPG                                                   16

SEQ ID NO: 155         moltype = AA  length = 17
FEATURE                Location/Qualifiers
source                 1..17
                       mol_type = protein
                       organism = Gallus gallus
SEQUENCE: 155
SILSEEGVPI SSGGFGI                                                  17

SEQ ID NO: 156         moltype = AA  length = 16
FEATURE                Location/Qualifiers
source                 1..16
                       mol_type = protein
                       organism = Gallus gallus
SEQUENCE: 156
PVVVTLPGPI LSSFPQ                                                   16

SEQ ID NO: 157         moltype = AA  length = 16
FEATURE                Location/Qualifiers
source                 1..16
                       mol_type = protein
                       organism = Gallus gallus
SEQUENCE: 157
RVVIQPSPVV VTLPGP                                                   16

SEQ ID NO: 158         moltype = AA  length = 18
FEATURE                Location/Qualifiers
source                 1..18
                       mol_type = protein
                       organism = Gallus gallus
SEQUENCE: 158
SAAVGSILSE EGVPISSG                                                 18

SEQ ID NO: 159         moltype = AA  length = 16
FEATURE                Location/Qualifiers
source                 1..16
                       mol_type = protein
                       organism = Gallus gallus
SEQUENCE: 159
VVVTLPGPIL SSFPQN                                                   16

SEQ ID NO: 160         moltype = AA  length = 18
FEATURE                Location/Qualifiers
source                 1..18
                       mol_type = protein
                       organism = Gallus gallus
SEQUENCE: 160
GVPISSGGFG ISGLGSRF                                                 18

SEQ ID NO: 161         moltype = AA  length = 17
FEATURE                Location/Qualifiers
source                 1..17
                       mol_type = protein
                       organism = Gallus gallus
SEQUENCE: 161
PSPVVVTLPG PILSSFP                                                  17

SEQ ID NO: 162         moltype = AA  length = 17
FEATURE                Location/Qualifiers
source                 1..17
                       mol_type = protein
                       organism = Gallus gallus
SEQUENCE: 162
VAIQPPPVVV TLPGPIL                                                  17

SEQ ID NO: 163         moltype = AA  length = 17
FEATURE                Location/Qualifiers
source                 1..17
                       mol_type = protein
                       organism = Gallus gallus
SEQUENCE: 163
VIQPSPVVVT LPGPILS                                                  17
```

-continued

```
SEQ ID NO: 164          moltype = AA  length = 17
FEATURE                 Location/Qualifiers
source                  1..17
                        mol_type = protein
                        organism = Gallus gallus
SEQUENCE: 164
VVIQPSPVVV TLPGPIL                                                 17

SEQ ID NO: 165          moltype = AA  length = 17
FEATURE                 Location/Qualifiers
source                  1..17
                        mol_type = protein
                        organism = Gallus gallus
SEQUENCE: 165
SPVVVTLPGP ILSSFPQ                                                 17

SEQ ID NO: 166          moltype = AA  length = 15
FEATURE                 Location/Qualifiers
source                  1..15
                        mol_type = protein
                        organism = Gallus gallus
SEQUENCE: 166
VILSNTKTQY SIKIH                                                   15

SEQ ID NO: 167          moltype = AA  length = 17
FEATURE                 Location/Qualifiers
source                  1..17
                        mol_type = protein
                        organism = Gallus gallus
SEQUENCE: 167
SRVVIQPSPV VVTLPGP                                                 17

SEQ ID NO: 168          moltype = AA  length = 17
FEATURE                 Location/Qualifiers
source                  1..17
                        mol_type = protein
                        organism = Gallus gallus
SEQUENCE: 168
DSRVVIQPSP VVVTLPG                                                 17

SEQ ID NO: 169          moltype = AA  length = 17
FEATURE                 Location/Qualifiers
source                  1..17
                        mol_type = protein
                        organism = Gallus gallus
SEQUENCE: 169
PVVVTLPGPI LSSFPQN                                                 17

SEQ ID NO: 170          moltype = AA  length = 17
FEATURE                 Location/Qualifiers
source                  1..17
                        mol_type = protein
                        organism = Gallus gallus
SEQUENCE: 170
RVVIQPSPVV VTLPGPI                                                 17

SEQ ID NO: 171          moltype = AA  length = 19
FEATURE                 Location/Qualifiers
source                  1..19
                        mol_type = protein
                        organism = Gallus gallus
SEQUENCE: 171
GVPISSGGFG ISGLGSRFS                                               19

SEQ ID NO: 172          moltype = AA  length = 18
FEATURE                 Location/Qualifiers
source                  1..18
                        mol_type = protein
                        organism = Gallus gallus
SEQUENCE: 172
SVAIQPPPVV VTLPGPIL                                                18

SEQ ID NO: 173          moltype = AA  length = 18
FEATURE                 Location/Qualifiers
source                  1..18
                        mol_type = protein
                        organism = Gallus gallus
SEQUENCE: 173
VAIQPPPVVV TLPGPILS                                                18
```

```
SEQ ID NO: 174          moltype = AA  length = 18
FEATURE                 Location/Qualifiers
source                  1..18
                        mol_type = protein
                        organism = Gallus gallus
SEQUENCE: 174
VVIQPSPVVV TLPGPILS                                               18

SEQ ID NO: 175          moltype = AA  length = 18
FEATURE                 Location/Qualifiers
source                  1..18
                        mol_type = protein
                        organism = Gallus gallus
SEQUENCE: 175
PSPVVVTLPG PILSSFPQ                                               18

SEQ ID NO: 176          moltype = AA  length = 20
FEATURE                 Location/Qualifiers
source                  1..20
                        mol_type = protein
                        organism = Gallus gallus
SEQUENCE: 176
GVPISSGGFG ISGLGSRFSG                                             20

SEQ ID NO: 177          moltype = AA  length = 18
FEATURE                 Location/Qualifiers
source                  1..18
                        mol_type = protein
                        organism = Gallus gallus
SEQUENCE: 177
AVPLVRPVTM VPSIPGIP                                               18

SEQ ID NO: 178          moltype = AA  length = 18
FEATURE                 Location/Qualifiers
source                  1..18
                        mol_type = protein
                        organism = Gallus gallus
SEQUENCE: 178
PPPVVVTLPG PILSSFPQ                                               18

SEQ ID NO: 179          moltype = AA  length = 18
FEATURE                 Location/Qualifiers
source                  1..18
                        mol_type = protein
                        organism = Gallus gallus
SEQUENCE: 179
SPVVVTLPGP ILSSFPQN                                               18

SEQ ID NO: 180          moltype = AA  length = 18
FEATURE                 Location/Qualifiers
source                  1..18
                        mol_type = protein
                        organism = Gallus gallus
SEQUENCE: 180
LPGPGLQLLH GTTTLAFK                                               18

SEQ ID NO: 181          moltype = AA  length = 18
FEATURE                 Location/Qualifiers
source                  1..18
                        mol_type = protein
                        organism = Gallus gallus
SEQUENCE: 181
PPPVVVTFPG PILSSFPQ                                               18

SEQ ID NO: 182          moltype = AA  length = 19
FEATURE                 Location/Qualifiers
source                  1..19
                        mol_type = protein
                        organism = Gallus gallus
SEQUENCE: 182
SVAIQPPPVV VTLPGPILS                                              19

SEQ ID NO: 183          moltype = AA  length = 19
FEATURE                 Location/Qualifiers
source                  1..19
                        mol_type = protein
                        organism = Gallus gallus
SEQUENCE: 183
```

```
SSVAIQPPPV VVTLPGPIL                                               19

SEQ ID NO: 184          moltype = AA  length = 18
FEATURE                 Location/Qualifiers
source                  1..18
                        mol_type = protein
                        organism = Gallus gallus
SEQUENCE: 184
RVVIQPSPVV VTLPGPIL                                                18

SEQ ID NO: 185          moltype = AA  length = 19
FEATURE                 Location/Qualifiers
source                  1..19
                        mol_type = protein
                        organism = Gallus gallus
SEQUENCE: 185
PSPVVVTLPG PILSSFPQN                                               19

SEQ ID NO: 186          moltype = AA  length = 21
FEATURE                 Location/Qualifiers
source                  1..21
                        mol_type = protein
                        organism = Gallus gallus
SEQUENCE: 186
SILSEEGVPI SSGGFGISGL G                                            21

SEQ ID NO: 187          moltype = AA  length = 19
FEATURE                 Location/Qualifiers
source                  1..19
                        mol_type = protein
                        organism = Gallus gallus
SEQUENCE: 187
SRVVIQPSPV VVTLPGPIL                                               19

SEQ ID NO: 188          moltype = AA  length = 19
FEATURE                 Location/Qualifiers
source                  1..19
                        mol_type = protein
                        organism = Gallus gallus
SEQUENCE: 188
RVVIQPSPVV VTLPGPILS                                               19

SEQ ID NO: 189          moltype = AA  length = 22
FEATURE                 Location/Qualifiers
source                  1..22
                        mol_type = protein
                        organism = Gallus gallus
SEQUENCE: 189
SVPIGAGGSL GLGGFGWSGL GR                                           22

SEQ ID NO: 190          moltype = AA  length = 22
FEATURE                 Location/Qualifiers
source                  1..22
                        mol_type = protein
                        organism = Gallus gallus
SEQUENCE: 190
TAVGSSTSAA VGSILSEEGV PI                                           22

SEQ ID NO: 191          moltype = AA  length = 22
FEATURE                 Location/Qualifiers
source                  1..22
                        mol_type = protein
                        organism = Gallus gallus
SEQUENCE: 191
SAAVGSILSE EGVPISSGGF GI                                           22

SEQ ID NO: 192          moltype = AA  length = 21
FEATURE                 Location/Qualifiers
source                  1..21
                        mol_type = protein
                        organism = Gallus gallus
SEQUENCE: 192
SEEGVPISSG GFGISGLGSR F                                            21

SEQ ID NO: 193          moltype = AA  length = 20
FEATURE                 Location/Qualifiers
source                  1..20
                        mol_type = protein
                        organism = Gallus gallus
```

```
SEQUENCE: 193
SRVVIQPSPV VVTLPGPILS                                              20

SEQ ID NO: 194          moltype = AA  length = 23
FEATURE                 Location/Qualifiers
source                  1..23
                        mol_type = protein
                        organism = Gallus gallus
SEQUENCE: 194
SVPIGAGGSL GLGGFGWSGL GRG                                          23

SEQ ID NO: 195          moltype = AA  length = 20
FEATURE                 Location/Qualifiers
source                  1..20
                        mol_type = protein
                        organism = Gallus gallus
SEQUENCE: 195
DSRVVIQPSP VVVTLPGPIL                                              20

SEQ ID NO: 196          moltype = AA  length = 23
FEATURE                 Location/Qualifiers
source                  1..23
                        mol_type = protein
                        organism = Gallus gallus
SEQUENCE: 196
TAVGSSTSAA VGSILSEEGV PIS                                          23

SEQ ID NO: 197          moltype = AA  length = 22
FEATURE                 Location/Qualifiers
source                  1..22
                        mol_type = protein
                        organism = Gallus gallus
SEQUENCE: 197
LRGDVGPVGR TGEQGIAGPP GF                                           22

SEQ ID NO: 198          moltype = AA  length = 21
FEATURE                 Location/Qualifiers
source                  1..21
                        mol_type = protein
                        organism = Gallus gallus
SEQUENCE: 198
SRVVIQPSPV VVTLPGPILS S                                            21

SEQ ID NO: 199          moltype = AA  length = 21
FEATURE                 Location/Qualifiers
source                  1..21
                        mol_type = protein
                        organism = Gallus gallus
SEQUENCE: 199
VVIQPSPVVV TLPGPILSSF P                                            21

SEQ ID NO: 200          moltype = AA  length = 22
FEATURE                 Location/Qualifiers
source                  1..22
                        mol_type = protein
                        organism = Gallus gallus
SEQUENCE: 200
GVPISSGGFG ISGLGSRFSG RR                                           22

SEQ ID NO: 201          moltype = AA  length = 24
FEATURE                 Location/Qualifiers
source                  1..24
                        mol_type = protein
                        organism = Gallus gallus
SEQUENCE: 201
SVPIGAGGSL GLGGFGWSGL GRGL                                         24

SEQ ID NO: 202          moltype = AA  length = 21
FEATURE                 Location/Qualifiers
source                  1..21
                        mol_type = protein
                        organism = Gallus gallus
SEQUENCE: 202
DSRVVIQPSP VVVTLPGPIL S                                            21

SEQ ID NO: 203          moltype = AA  length = 21
FEATURE                 Location/Qualifiers
source                  1..21
                        mol_type = protein
```

```
                        organism = Gallus gallus
SEQUENCE: 203
VIQPSPVVVT LPGPILSSFP Q                                                21

SEQ ID NO: 204          moltype = AA  length = 24
FEATURE                 Location/Qualifiers
source                  1..24
                        mol_type = protein
                        organism = Gallus gallus
SEQUENCE: 204
AVGSILSEEG VPISSGGFGI SGLG                                             24

SEQ ID NO: 205          moltype = AA  length = 21
FEATURE                 Location/Qualifiers
source                  1..21
                        mol_type = protein
                        organism = Gallus gallus
SEQUENCE: 205
RVVIQPSPVV VTLPGPILSS F                                                21

SEQ ID NO: 206          moltype = AA  length = 23
FEATURE                 Location/Qualifiers
source                  1..23
                        mol_type = protein
                        organism = Gallus gallus
SEQUENCE: 206
SILSEEGVPI SSGGFGISGL GSR                                              23

SEQ ID NO: 207          moltype = AA  length = 21
FEATURE                 Location/Qualifiers
source                  1..21
                        mol_type = protein
                        organism = Gallus gallus
SEQUENCE: 207
IPSSVPESSF KIKGNSSSFH I                                                21

SEQ ID NO: 208          moltype = AA  length = 22
FEATURE                 Location/Qualifiers
source                  1..22
                        mol_type = protein
                        organism = Gallus gallus
SEQUENCE: 208
VAIQPPPVVV TLPGPILSSF PQ                                               22

SEQ ID NO: 209          moltype = AA  length = 25
FEATURE                 Location/Qualifiers
source                  1..25
                        mol_type = protein
                        organism = Gallus gallus
SEQUENCE: 209
TAVGSSTSAA VGSILSEEGV PISSG                                            25

SEQ ID NO: 210          moltype = AA  length = 22
FEATURE                 Location/Qualifiers
source                  1..22
                        mol_type = protein
                        organism = Gallus gallus
SEQUENCE: 210
VVIQPSPVVV TLPGPILSSF PQ                                               22

SEQ ID NO: 211          moltype = AA  length = 23
FEATURE                 Location/Qualifiers
source                  1..23
                        mol_type = protein
                        organism = Gallus gallus
SEQUENCE: 211
PSPVVVTLPG PILSSFPQNT AVG                                              23

SEQ ID NO: 212          moltype = AA  length = 20
FEATURE                 Location/Qualifiers
source                  1..20
                        mol_type = protein
                        organism = Gallus gallus
SEQUENCE: 212
KENFEVLCKD GTRKPVTDAE                                                  20

SEQ ID NO: 213          moltype = AA  length = 21
FEATURE                 Location/Qualifiers
source                  1..21
```

```
                        mol_type = protein
                        organism = Gallus gallus
SEQUENCE: 213
SIQACKLAQS HGWGVMVSHR S                                                21

SEQ ID NO: 214          moltype = AA  length = 22
FEATURE                 Location/Qualifiers
source                  1..22
                        mol_type = protein
                        organism = Gallus gallus
SEQUENCE: 214
SRVVIQPSPV VVTLPGPILS SF                                               22

SEQ ID NO: 215          moltype = AA  length = 22
FEATURE                 Location/Qualifiers
source                  1..22
                        mol_type = protein
                        organism = Gallus gallus
SEQUENCE: 215
RVVIQPSPVV VTLPGPILSS FP                                               22

SEQ ID NO: 216          moltype = AA  length = 23
FEATURE                 Location/Qualifiers
source                  1..23
                        mol_type = protein
                        organism = Gallus gallus
SEQUENCE: 216
EQPPLCVASV SVKEPASETP AVP                                              23

SEQ ID NO: 217          moltype = AA  length = 23
FEATURE                 Location/Qualifiers
source                  1..23
                        mol_type = protein
                        organism = Gallus gallus
SEQUENCE: 217
SVAIQPPPVV VTLPGPILSS FPQ                                              23

SEQ ID NO: 218          moltype = AA  length = 26
FEATURE                 Location/Qualifiers
source                  1..26
                        mol_type = protein
                        organism = Gallus gallus
SEQUENCE: 218
SAAVGSILSE EGVPISSGGF GISGLG                                           26

SEQ ID NO: 219          moltype = AA  length = 24
FEATURE                 Location/Qualifiers
source                  1..24
                        mol_type = protein
                        organism = Gallus gallus
SEQUENCE: 219
SILSEEGVPI SSGGFGISGL GSRF                                             24

SEQ ID NO: 220          moltype = AA  length = 24
FEATURE                 Location/Qualifiers
source                  1..24
                        mol_type = protein
                        organism = Gallus gallus
SEQUENCE: 220
PSPVVVTLPG PILSSFPQNT AVGS                                             24

SEQ ID NO: 221          moltype = AA  length = 23
FEATURE                 Location/Qualifiers
source                  1..23
                        mol_type = protein
                        organism = Gallus gallus
SEQUENCE: 221
VVIQPSPVVV TLPGPILSSF PQN                                              23

SEQ ID NO: 222          moltype = AA  length = 23
FEATURE                 Location/Qualifiers
source                  1..23
                        mol_type = protein
                        organism = Gallus gallus
SEQUENCE: 222
SRVVIQPSPV VVTLPGPILS SFP                                              23

SEQ ID NO: 223          moltype = AA  length = 24
FEATURE                 Location/Qualifiers
```

```
source                  1..24
                        mol_type = protein
                        organism = Gallus gallus
SEQUENCE: 223
SSVAIQPPPV VVTLPGPILS SFPQ                                          24

SEQ ID NO: 224          moltype = AA  length = 23
FEATURE                 Location/Qualifiers
source                  1..23
                        mol_type = protein
                        organism = Gallus gallus
SEQUENCE: 224
RVVIQPSPVV VTLPGPILSS FPQ                                           23

SEQ ID NO: 225          moltype = AA  length = 25
FEATURE                 Location/Qualifiers
source                  1..25
                        mol_type = protein
                        organism = Gallus gallus
SEQUENCE: 225
SILSEEGVPI SSGGFGISGL GSRFS                                         25

SEQ ID NO: 226          moltype = AA  length = 27
FEATURE                 Location/Qualifiers
source                  1..27
                        mol_type = protein
                        organism = Gallus gallus
SEQUENCE: 226
TSAAVGSILS EEGVPISSGG FGISGLG                                       27

SEQ ID NO: 227          moltype = AA  length = 26
FEATURE                 Location/Qualifiers
source                  1..26
                        mol_type = protein
                        organism = Gallus gallus
SEQUENCE: 227
SILSEEGVPI SSGGFGISGL GSRFSG                                        26

SEQ ID NO: 228          moltype = AA  length = 24
FEATURE                 Location/Qualifiers
source                  1..24
                        mol_type = protein
                        organism = Gallus gallus
SEQUENCE: 228
SRVVIQPSPV VVTLPGPILS SFPQ                                          24

SEQ ID NO: 229          moltype = AA  length = 28
FEATURE                 Location/Qualifiers
source                  1..28
                        mol_type = protein
                        organism = Gallus gallus
SEQUENCE: 229
TAVGSSTSAA VGSILSEEGV PISSGGFG                                      28

SEQ ID NO: 230          moltype = AA  length = 28
FEATURE                 Location/Qualifiers
source                  1..28
                        mol_type = protein
                        organism = Gallus gallus
SEQUENCE: 230
STSAAVGSIL SEEGVPISSG GFGISGLG                                      28

SEQ ID NO: 231          moltype = AA  length = 24
FEATURE                 Location/Qualifiers
source                  1..24
                        mol_type = protein
                        organism = Gallus gallus
SEQUENCE: 231
RVVIQPSPVV VTLPGPILSS FPQN                                          24

SEQ ID NO: 232          moltype = AA  length = 25
FEATURE                 Location/Qualifiers
source                  1..25
                        mol_type = protein
                        organism = Gallus gallus
SEQUENCE: 232
SRVVIQPSPV VVTLPGPILS SFPQN                                         25

SEQ ID NO: 233          moltype = AA  length = 25
```

```
FEATURE                Location/Qualifiers
source                 1..25
                       mol_type = protein
                       organism = Gallus gallus
SEQUENCE: 233
DSRVVIQPSP VVVTLPGPIL SSFPQ                                         25

SEQ ID NO: 234         moltype = AA  length = 29
FEATURE                Location/Qualifiers
source                 1..29
                       mol_type = protein
                       organism = Gallus gallus
SEQUENCE: 234
TAVGSSTSAA VGSILSEEGV PISSGGFGI                                     29

SEQ ID NO: 235         moltype = AA  length = 29
FEATURE                Location/Qualifiers
source                 1..29
                       mol_type = protein
                       organism = Gallus gallus
SEQUENCE: 235
SAAVGSILSE EGVPISSGGF GISGLGSRF                                     29

SEQ ID NO: 236         moltype = AA  length = 24
FEATURE                Location/Qualifiers
source                 1..24
                       mol_type = protein
                       organism = Gallus gallus
SEQUENCE: 236
VEQLVNLQHL DVAYNLLLEH AQLA                                          24

SEQ ID NO: 237         moltype = AA  length = 28
FEATURE                Location/Qualifiers
source                 1..28
                       mol_type = protein
                       organism = Gallus gallus
SEQUENCE: 237
SVAIQPPPVV VTLPGPILSS FPQSTAVG                                      28

SEQ ID NO: 238         moltype = AA  length = 28
FEATURE                Location/Qualifiers
source                 1..28
                       mol_type = protein
                       organism = Gallus gallus
SEQUENCE: 238
SILSEEGVPI SSGGFGISGL GSRFSGRR                                      28

SEQ ID NO: 239         moltype = AA  length = 30
FEATURE                Location/Qualifiers
source                 1..30
                       mol_type = protein
                       organism = Gallus gallus
SEQUENCE: 239
TSAAVGSILS EEGVPISSGG FGISGLGSRF                                    30

SEQ ID NO: 240         moltype = AA  length = 29
FEATURE                Location/Qualifiers
source                 1..29
                       mol_type = protein
                       organism = Gallus gallus
SEQUENCE: 240
SSVAIQPPPV VVTLPGPILS SFPQSTAVG                                     29

SEQ ID NO: 241         moltype = AA  length = 31
FEATURE                Location/Qualifiers
source                 1..31
                       mol_type = protein
                       organism = Gallus gallus
SEQUENCE: 241
STSAAVGSIL SEEGVPISSG GFGISGLGSR F                                  31

SEQ ID NO: 242         moltype = AA  length = 31
FEATURE                Location/Qualifiers
source                 1..31
                       mol_type = protein
                       organism = Gallus gallus
SEQUENCE: 242
PSPVVVTLPG PILSSFPQNT AVGSSTSAAV G                                  31
```

```
SEQ ID NO: 243          moltype = AA  length = 33
FEATURE                 Location/Qualifiers
source                  1..33
                        mol_type = protein
                        organism = Gallus gallus
SEQUENCE: 243
TAVGSSTSAA VGSILSEEGV PISSGGFGIS GLG                              33

SEQ ID NO: 244          moltype = AA  length = 31
FEATURE                 Location/Qualifiers
source                  1..31
                        mol_type = protein
                        organism = Gallus gallus
SEQUENCE: 244
AVGSILSEEG VPISSGGFGI SGLGSRFSGR R                                31

SEQ ID NO: 245          moltype = AA  length = 27
FEATURE                 Location/Qualifiers
source                  1..27
                        mol_type = protein
                        organism = Gallus gallus
SEQUENCE: 245
NKVLVHCAMG RSRSATLVLA YLMIYKN                                     27

SEQ ID NO: 246          moltype = AA  length = 32
FEATURE                 Location/Qualifiers
source                  1..32
                        mol_type = protein
                        organism = Gallus gallus
SEQUENCE: 246
SSVAIQPPPV VVTLPGPILS SFPQSTAVGS TA                               32

SEQ ID NO: 247          moltype = AA  length = 32
FEATURE                 Location/Qualifiers
source                  1..32
                        mol_type = protein
                        organism = Gallus gallus
SEQUENCE: 247
AAVGSILSEE GVPISSGGFG ISGLGSRFSG RR                               32

SEQ ID NO: 248          moltype = AA  length = 35
FEATURE                 Location/Qualifiers
source                  1..35
                        mol_type = protein
                        organism = Gallus gallus
SEQUENCE: 248
TAVGSSTSAA VGSILSEEGV PISSGGFGIS GLGSR                            35

SEQ ID NO: 249          moltype = AA  length = 33
FEATURE                 Location/Qualifiers
source                  1..33
                        mol_type = protein
                        organism = Gallus gallus
SEQUENCE: 249
SAAVGSILSE EGVPISSGGF GISGLGSRFS GRR                              33

SEQ ID NO: 250          moltype = AA  length = 34
FEATURE                 Location/Qualifiers
source                  1..34
                        mol_type = protein
                        organism = Gallus gallus
SEQUENCE: 250
PSPVVVTLPG PILSSFPQNT AVGSSTSAAV GSIL                             34

SEQ ID NO: 251          moltype = AA  length = 35
FEATURE                 Location/Qualifiers
source                  1..35
                        mol_type = protein
                        organism = Gallus gallus
SEQUENCE: 251
PSPVVVTLPG PILSSFPQNT AVGSSTSAAV GSILS                            35

SEQ ID NO: 252          moltype = AA  length = 36
FEATURE                 Location/Qualifiers
source                  1..36
                        mol_type = protein
                        organism = Gallus gallus
SEQUENCE: 252
TAVGSSTSAA VGSILSEEGV PISSGGFGIS GLGSRF                           36
```

-continued

```
SEQ ID NO: 253          moltype = AA  length = 29
FEATURE                 Location/Qualifiers
source                  1..29
                        mol_type = protein
                        organism = Gallus gallus
SEQUENCE: 253
RPRVYLHCTN PRHPKYREGD VTLFALNLS                                        29
```

METHOD FOR PROMOTING THE GROWTH OF COTTON UNDER LOW TEMPERATURE STRESS

PRIORITY CLAIM TO FOREIGN APPLICATION

Applicant hereby makes priority claim to a Taiwan application, number 112151694, having the Taiwan filing date of Dec. 29, 2023.

SEQUENCE LISTING

Table I (in Sequence Listing XML format) shows the at least 253 peptides and its annotated sequences for the solution generated in accordance with the disclosure of this application. The Sequence Listing XML file complies with the WIPO ST.26 requirements. Said XML copy, created on Mar. 17, 2024, is named Table-I-253_sequence and is 216 bytes in size.

Applicant hereby incorporates by reference said Sequence Listing XML file in its entirety as part of the disclosure and specification of the present application

BACKGROUND OF THE INVENTION

Present invention disclosed and claimed a method and application of a keratin hydrolysis peptide ("KHP") solution to promote the growth of cotton under low temperature stress.

Hydrolyzed keratin has long been used to strengthen hairs, reduce hair splitting and breakage. Other beneficial uses include skin moisturization and wound healing. Keratin hydrolysate has also been known to function as a biofertilizer, boosting plants' growth by enhancing the plants' ability to receive and utilize nutrients, including commonly applied fertilizers.

The KHP solution is made by a hydrolysis process using feathers and water, via a high-temperature and high-pressure process, resulting in a solution that has many beneficial applications in the fields of horticulture, agriculture and potentially other farming businesses.

Among the embodiments disclosed and claimed in this application, one specific embodiment used feathers only, without water, to be treated with the high-temperature and high-pressure process as taught herein to produce a specific version of the KHP

Solution

Cotton is one of the most important economic crops throughout human history. The global production, based upon FAO's 2020 statistics, reached 24 million metric tons, having planting area of over thirty million hectares. As a fiber-rich crop, the cotton plant is widely used in textile and manufacturing businesses.

During development period, cotton's grown is sensitive to temperature changes, especially in the seeding and germination stages. It is generally known that the temperature range of 28+/−3 °C is the preferred range for cotton to grow. When the temperature drops below 23 °C, the cotton's growth starts to experience slowing down and other ill effects. It is generally known that the lowest temperature being around 15.5 °C when the growth would practically stop.

Cotton seedlings, when encountering the adversity of low temperature, will suffer from slower development, negatively affecting the plant height, leaf's surface area, chlorophyll count and the capacity for photosynthesis. Such negative impact leads to ultimate reduction of production. Take the State of Mississippi, the cold and wet Spring of 2015 affected the cotton's growth and development, resulting in late flowering and blooming, and ultimately leading to the severe reduction of cotton production for that year.

People learned, from years and generations of experiences, that the good production management for the cotton growth and harvesting depends, to a great degree on the germination and seedling in proper temperature range.

People also learned that it is preferable to increase the cotton seedlings' tolerance to adversity of low temperature, so as to reduce the negative impact of low temperature, as well as the impact of climate change, that plagues the cotton industries.

The present invention's KHP solution and the method of using same is a cost-effective way to improve the growth of cotton due to the negative impact of low temperature adversity.

The inventors of present application conducted numerous tests and confirmed the effectiveness of applying the KHP solution as disclosed and claimed herein.

SUMMARY OF THE INVENTION

The keratin solution is primarily based upon feather, which contains 85-91% keratin, 13-15% organic nitrogen, 1.6-2% organic sulfur, as well as other materials. The high keratin content has drawn many prior researches that work to break down, by enzyme, chemical agents, or fermentation process, into peptides, amino acids and other smaller molecules that can be used for animal feeds, plant fertilizers, and cultivation bases.

Around 2019, Nurdiawati, et al, came up with a hydrolysis process, by the mixture of α-amylase and protease to hydrolyze feather waste, resulting in a mixture of amino acids, fatty acids, and sugars. Nurdiawati experimented and adopted certain specific high-temperature and high-pressure setting in the hydrolysis process and discovered that the resulting solution, when mixed with some potassium and other minerals, can boost the growth of Pogostemon cablin and Vigna radiata, as reported in International Journal of Recycling or Organic Waste in Agriculture (8:221-232, 2019).

The inventors of present application, under the aegis of CH Biotech, developed and selected different feather and water compositions to perform the hydrolysis at higher temperature and higher pressure settings, resulting with different keratin hydrolysis peptide ("KHP") solution that can be used on different crops/plants.

The selected embodiment of present invention uses a mixture of water and feathers, and subject the mixture to a thermal hydrolysis process to create KHP solutions based upon temperature/pressure parameters as noted below.

The inventors used Dionex® UltiMate® 3000 UPLC to separate the peptides; an analysis is done via Thermo Orbitrap® Fushion™ Lumos™ Tribrid™ Orbitrap® mass spectrometry to identify the peptides, which are then subsequently confirmed by looking up the BIOPEP-UWM database.

The solutions are infused to the soil containing the cotton seeds. Alternatively, the solutions can be sprayed to the leaf surface of young cotton seedlings, and infused into the soil, at certain grown stage.

The solution can be diluted by water, at 50 to 500 ratio (noted as 50× to 500×) by volume.

BRIEF DESCRIPTION OF DRAWINGS

The accompanying drawings, figures and tables, which are incorporated in and constitute a part of this specification, illustrate and exemplify the preferred embodiments of the invention. Together with the description, serve to explain the principles of the invention.

DETAILED DESCRIPTION OF THE INVENTION

Figure 1A:
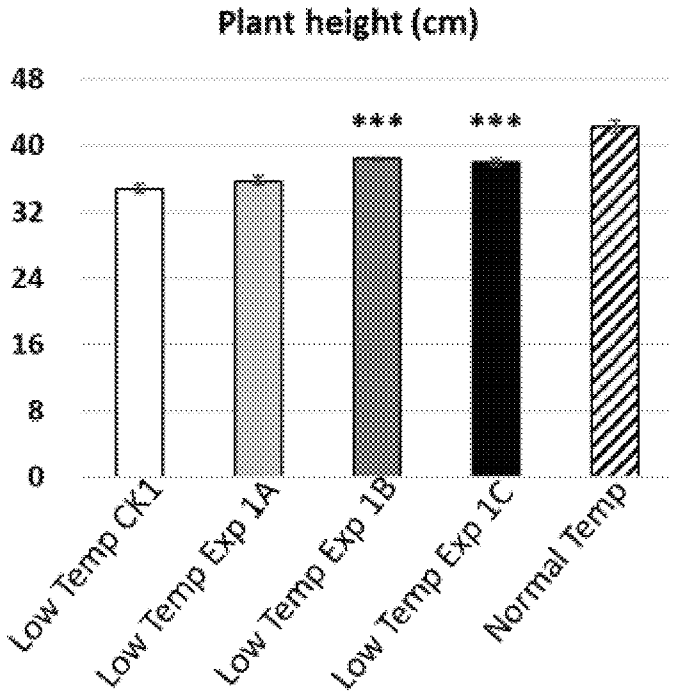
FIG. 1A shows the comparison of cotton plant heights, 21 days after exiting low temperature treatment, among different groups under low temperature treatment, as compared to cotton plants grown in normal temperature setting.

The keratin hydrolysis peptide ("KHP") solution of present invention is made by a high-temperature and high-pressure process to treat a mixture of water and feathers as shown in the parameters herein.

The mixture ratio, temperature, pressure and duration parameters are shown herein:

| KHP # | Feather (kg) | Water (kg) | Water content in feather (%) | Pressure ($kg/cm^2$) | Temp. (°C) | Time (min) | Mass (Da) | Concen. (ppm) |
|---|---|---|---|---|---|---|---|---|
| 1 | 70 | 0 | 46% | 13 | 180 | 40 | 705.9~3194.7 | 381250 |
| 2 | 50 | 40 | 50% | 12 | 185 | 80 | 593.3~3508.9 | 301500 |

A first embodiment of keratin hydrolysis peptide (KHP) solution, without water, can be made by 70 kg of feathers, with the feathers' water content being 46%, and then treated by the steps of:

a. stirring the feathers in a sealed container;
b. hydrolyzing the feathers in the container with a temperature and pressure setting of 180 °C and 13 kg/cm$^2$ for a duration of 40 minutes;
c. using a mass spectrometer to confirm the combination of peptides in the solution to contain at least 253 peptides as listed in the specification whereby their molecular masses are between 705.9 and 3,194.7 Dalton, and the concentration is in the range of $2.0\times10^5$~$4.5\times10^5$ ppm.

The keratin hydrolysis peptide (KHP) solution of the first embodiment is further filtered and concentrated to 381,250 ppm concentration.

The KHP solution of the second embodiment takes the steps of:

a. Preparing the KHP solution by mixing 50 kg of feathers whose content is 50% water with 40 kg of water in a sealed container;
b. hydrolyzing the mixture in the container with a temperature and pressure setting of 185 °C and 12 kg/cm$^2$ for a duration of 80 minutes;
c. using a mass spectrometer to confirm the combination of peptides in the solution to contain at least 253 peptides as listed in the specification where their molecular masses are between 500 and 4,000 Daltons, and the concentration is in the range of $2.0\times10^5$~$4.5\times10^5$ ppm.

The KHP solution of the second embodiment is further filtered and concentrated to 301,500 ppm concentration.

The confirmation of some of the 253 peptides is further done by referencing the BIOPEP-UWM database.

To test the effectiveness of the method of promoting cotton growth by application of KHP solutions under low temperature setting, the Deltapine 1646 B2XF species was selected by the inventors to conduct experiments and tests.

Healthy seeds are screened and planted in starter soil, and then planted into 5-inch pots when the first true leaf appears; one seed per pot. The pots are placed in climate-control rooms with 16 hours of day light and 8 hours of dark time. In addition to normal watering, common HuaBao #2 instant fertilizer was applied to the cotton plants, 0.13 g per pot.

The inventors defined first experiment groups of cotton in pots. Normal temperature group where the pots are given the temperature of 28° C. during day light hours, and 25° C. during night time hours.

The other groups are given low temperature treatment; the check group (CK) is not given any KHP solutions, other groups, noted as experiment groups of EXP 1 A/B/C, are given KHP solutions as specifically noted below.

For low temperature CK group, when the 3$^{rd}$ true leaf appears, the cotton pots are given the day time 23 °C and night time 21 °C treatment.

For the first experiment batch, the cotton pots are given the same low temperature treatment, but with KHP solutions applied in the manner as further described below.

| Group | Day/night [a] temp(°C) | Style of application | Dosage given | dilution |
|---|---|---|---|---|
| Normal Temp | 28/25 | — | — | — |
| Low Temp CK1 | | — | — | — |

-continued

| Group | Day/night [a] temp(°C) | Style of application | Dosage given | dilution |
|---|---|---|---|---|
| Low Temp Exp 1A | 23/21 | Leaf spray | KHP-1 [b] | 500x |
| Low Temp Exp 1B | | Leaf spray | KHP-2 [b] | 500x |
| Low Temp Exp 1C | | Soil infusion | KHP-1 [c] | 100x |

[a] Day time 16 hours, night time 8 hours
[b] KHP solution used volume is 2 ml/plant
[c] KHP solution used volume is 100 ml/pot In the first experiment groups, at the time when the third true leaf appears, KHP solutions are given as shown in the table above; then the 4 low temperature groups are given low temperature treatment for 7 days, after which they are returned to normal temperature setting.

On the 21$^{st}$ day after returning to normal temperature setting, the inventors took various measurements to compare the plant heights, stem widths, leaf counts, leaf surface area and above-ground dry weights to gauge the effectiveness of KHP solution used to promote growth in the adversity of low temperature experienced by cottons. The results are tabulated into figures described below.

As shown in FIG. 1A, the KHP solution is administered after the third true leaf appeared. The Low Temp CK1 group's plant height is worse than the Normal Temp group; with the application of the KHP-1 and KHP-2 solutions as noted, the plant heights increased. Notably, the Low Temp Exp 1C group, soil infusion of KHP-1 100× solution has the biggest boost on plant height.

Figure 1B:
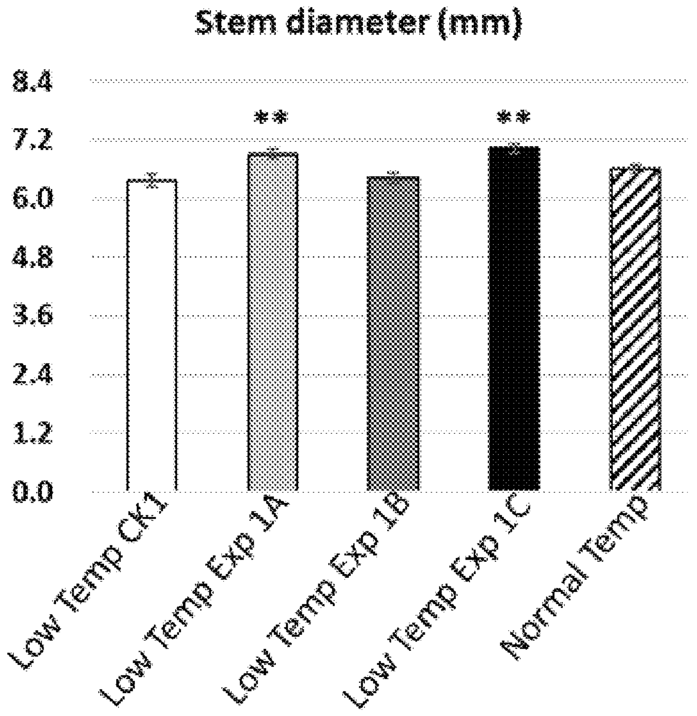
FIG. 1B shows the comparison of cotton stem widths, 21 days after exiting low temperature treatment, among different groups under low temperature treatment, as compared to cotton plants grown in normal temperature setting.

FIG. 1B reflects the comparison of stem widths when the KHP solution was applied after the third true leaf appeared. Again, the Low Temp CK1 group has the worse stem width, whereas the Low Temp Exp 1C group, with KHP-1 100× solution infused into soil, has the best stem width reading.

Figure 1C:
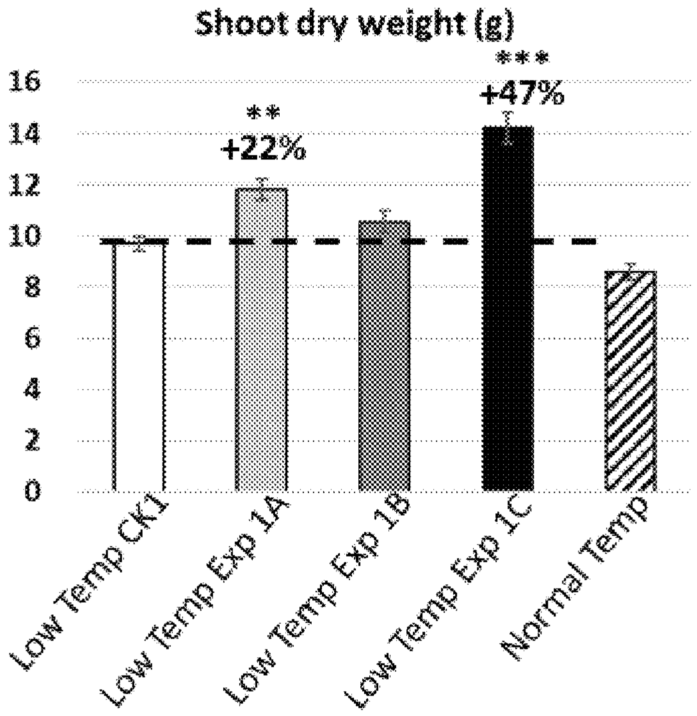
FIG. 1C shows the comparison of cotton above-ground biomass dry weights, 21 days after exiting low temperature treatment, among different groups under low temperature treatment, as compared to cotton plants grown in normal temperature setting.

FIG. 1C reflects the comparison of above-ground bio mass dry weights. The three experiment groups, Exp 1A, Exp 1B and Exp 1C, all show better dry weights than the Normal Temp group, with the Low Temp Exp 1C group at almost 50% over that of the Low Temp Ck1 group.

The inventors measured the leaf surface areas from the third leaf to the tenth leaf, on the 21$^{st}$ day after the low temperature treatment. The leaves are collected, scanned into files, then analyzed and computed using WinFOLIA software (WinFOLIA Pro 2014a, Regent Instruments, Inc.)

Figure 2:
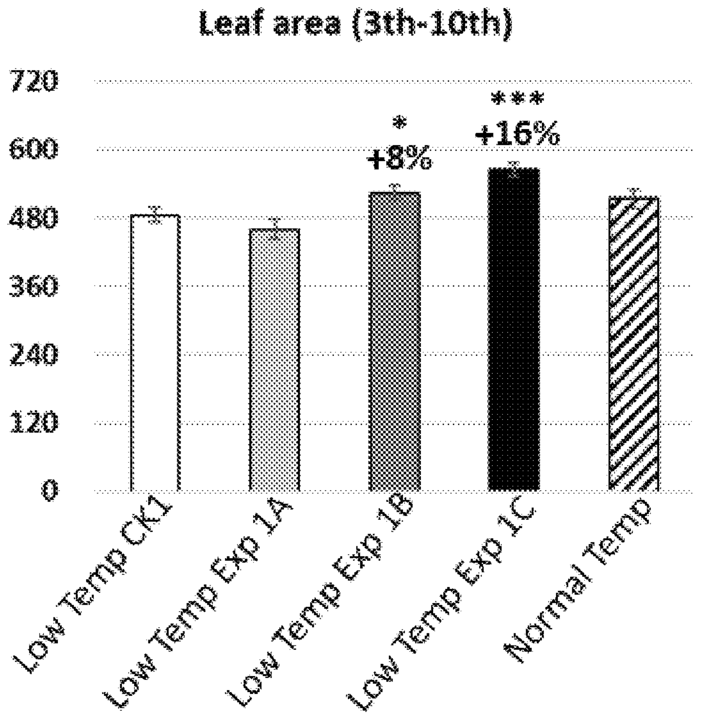
FIG. 2 shows the comparison of leaf surface area, from $3^{rd}$ to $10^{th}$ leaves, among different groups under low temperature treatment, as compared to cotton plants grown in normal temperature setting.

FIG. 2 shows the Low Temp Exp 1C group, administered with KHP-1 100× solution infused into soil when the third true leaf appeared, has the highest leaf surface area, with an increase of 16% over that of the Low Temp Ck1 group.

To test the effectiveness of the method of KHP solution to counter the adversity of low temperature environment to cotton plants, the inventors conducted second experiment batch, and set further lower temperature to 18 °C for both day and night and conducted experiments where the soil is infused with KHP solution after seeding.

After 11-13 days, the seedlings are given three (3) days of low temperature treatment of 18 °C, then returned to normal temperature setting. The pots in the low temperature check group CK2 are given 28/25 °C for the day time and night time house. The conditions are as noted in the table below:

| Group | Day/night [a] temp(°C) | Dosage given | Dilution ratio |
|---|---|---|---|
| Normal Temp | 28/25 | — | — |
| Low Temp Ck 2 | 18/18 | — | — |
| Low Temp Exp 2A | | KHP-2 [b] | 100x |
| Low Temp Exp 2B | | KHP-2 [b] | 50x |

[a] Day time 16 hours, night time 8 hours
[b] KHP solution used volume is 300 ml/pot The inventors took plant height measurements on the 14$^{th}$ day after seeding, which is the first day out of the low temperature treatment. The inventors further take measurements of plant heights, stem widths, leaf count on the main stem and leaf surface area, etc., on the 33$^{rd}$ day after seeding, which is the 19$^{th}$ day out of the low temperature treatment.

Figure 3:
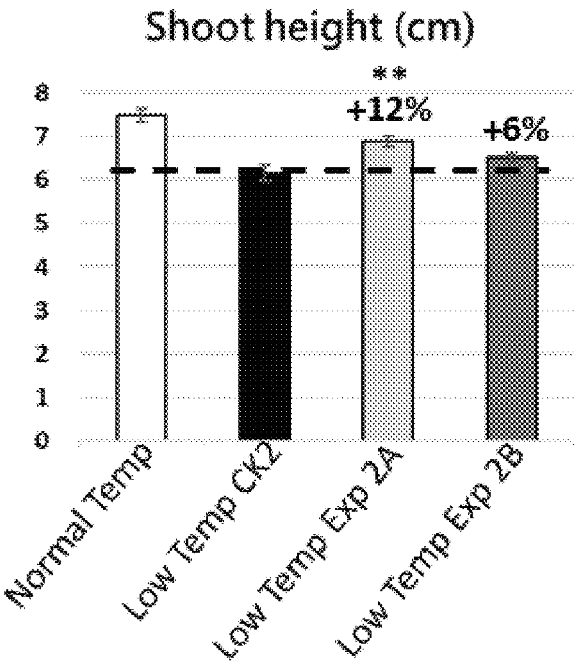
FIG. 3 shows, when temperature is further lowered, the plant height comparisons measured on the first day after exiting low temperature treatment.

FIG. 3 shows the impact of the KHP solution on plant height the first day the seedlings are returned to normal temperature setting after 3-day's low temperature treatment. The groups with KHP solution applied show better plant height than the Low Temperature Ck2 groups, by, respectively, 12% and 6% for the Low Temp Exp 2A group and Low Temp Exp 2B group.

Figure 4A:
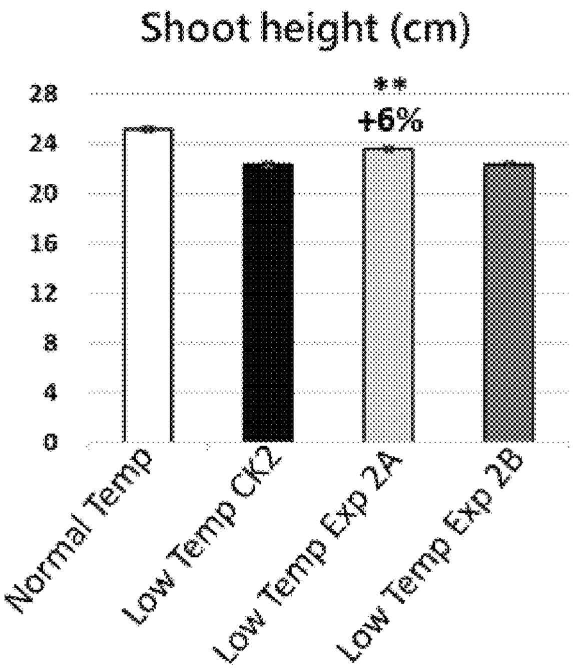
FIG. 4A shows, when the temperature is further lowered, the plant height comparison measured on the $19^{th}$ day after exiting low temperature treatment.
Figure 4B:
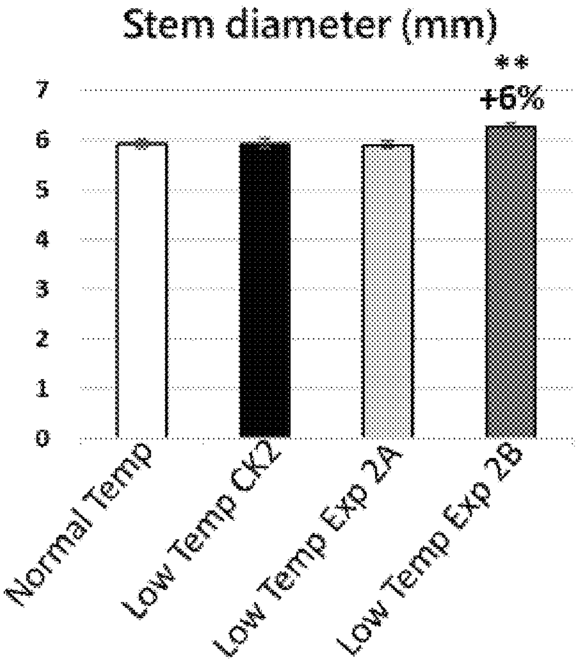
FIG. 4B shows, when the temperature is further lowered, the stem with comparison measured on the $19^{th}$ day after exiting low temperature treatment.
Figure 4C:
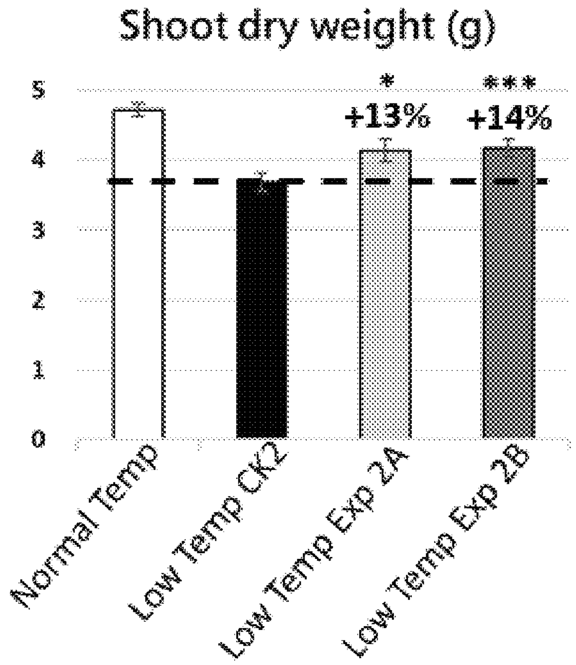
FIG. 4C shows, when the temperature is further lowered, the above-ground biomass dry weight comparison measured on the $19^{th}$ day after exiting low temperature treatment.

On the 19$^{th}$ day after exiting the low temperature treatment, the plant heights, stem widths, and above-ground biomass dry weights are tabulated into FIGS. 4A, 4B and 4C.

In FIG. 4A, the cotton plants in Low Temp Exp 2A groups shows obvious improvement over that of the Low Temp Ck2 group, by 6% increase in plant heights.

In FIG. 4B, the stem width of the Low Temp Exp 2B group is better than the Low Temp Ck2 group by 6%, and in fact performed better than the normal temperature group.

In FIG. 4C, both KHP groups show higher above-ground biomass dry weights, with increase of 13% and 14% respectively for Low Temp Exp 2A group and Low Temp Exp 2B group, over that of the Low Temp Ck 2 group.

Figure 5:
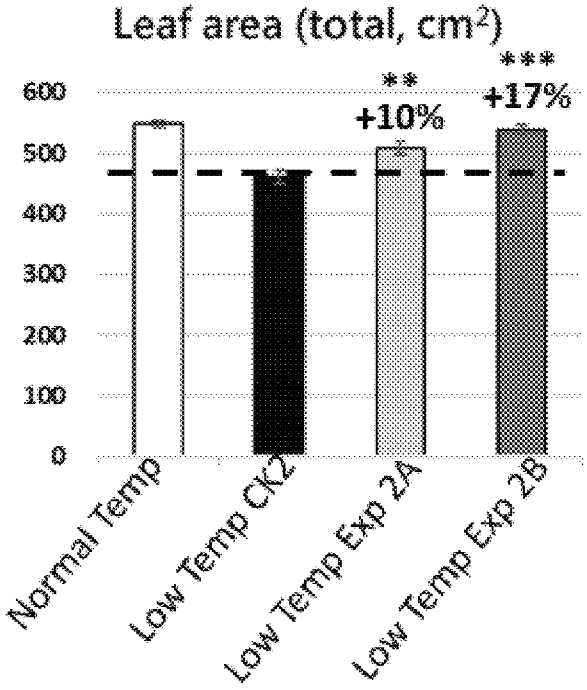
FIG. 5 shows, when the temperature is further lowered, the leaf surface area comparison measured on the $19^{th}$ day after exiting low temperature treatment.

In FIG. 5, the leaf surface area, analyzed and computed using WinFOLIA software (WinFOLIA Pro 2014a, Regent Instruments, Inc.) by the inventors, show that Low Temp Exp 2A group and Low Temp Exp 2B group have larger surface areas, at 10% and 17% respectively, more than that of the Low Temp Ck2 group.

As has been proven by the tests conducted and verified via the scientific analysis/measurement done by the inventors, the method of creating the KHP solution and the method of application will promote the growth of cotton under adversity of low temperature, and to reach the health conditions comparable to cotton growing in normal temperature settings.

While the disclosure herein gave limited teachings and embodiment examples, it should be noted that the description and disclosure made herein illustrated the preferred embodiments of the invention and are not meant to limit the scope of the applicant's rights. Variations and alterations may be employed for yet additional embodiments without departing from the scope of the invention herein.

The invention claimed is:

1. A method of using a keratin hydrolysis peptide (KHP) solution to promote the growth of cotton under low temperature stress, comprising the steps of:

a. preparing the KHP solution by putting 70 kg of feathers whose water content is 46%, without mixing any water, in a sealed container;

b. hydrolyzing the mixture in the container with a temperature and pressure setting of 180 °C and 13 $kg/cm^2$ for a duration of 40 minutes;

c. using a mass spectrometer to confirm the combination of peptides in the solution to contain at least 253 peptides, wherein the 253 peptides comprise the amino acid sequences of SEQ ID Nos: 1-253 where their molecular masses are between 500 and 4,000 Daltons, and the concentration is in the range of $2.0\times10^5$~$4.5\times10^5$ ppm; and d. applying the KHP solution by first diluting with water by volume at the ratio of 1:50 to 1:500 before application.

2. The method of using a keratin hydrolysis peptide solution of claim 1 wherein the application of the solution is by infusing into the soil immediately after planting the cotton seeds.

3. The method of using a keratin hydrolysis peptide solution of claim 1 wherein the application of the solution is by infusing into the soil when the cotton seedling's third true leaf appears.

4. The method of using a keratin hydrolysis peptide solution of claim 1 wherein the application of the solution is by leaf spraying to the cotton seedling's leaf surface when the third true leaf appears.

5. A method of using a keratin hydrolysis peptide (KHP) solution to promote the growth of cotton under low temperature stress, comprising the steps of:

a. preparing the KHP solution by mixing 50 kg of feathers whose content is 50% water and 40 kg of water in a sealed container;

b. hydrolyzing the mixture in the container with a temperature and pressure setting of 185 °C and 12 $kg/cm^2$ for a duration of 80 minutes;

c. using a mass spectrometer to confirm the combination of peptides in the solution to contain at least 253 peptides, wherein the 253 peptides comprise the amino acid sequences of SEQ ID Nos: 1-253 where their molecular masses are between 500 and 4,000 Daltons, and the concentration is in the range of $2.0\times10^5$~$4.5\times10^5$ ppm; and d. applying the KHP solution by first diluting with water by volume at the ratio of 1:50 to 1:500.

6. The method of using a keratin hydrolysis peptide solution of claim 5 wherein the application of the solution is by infusing into the soil immediately after planting the cotton seeds.

7. The method of using a keratin hydrolysis peptide solution of claim 5 wherein the application of the solution is by infusing into the soil when the cotton seedling's third true leaf appears.

8. The method of using a keratin hydrolysis peptide solution of claim 5 wherein the application of the solution is by leaf spraying to the cotton seedling's leaf surface when the third true leaf appears.

* * * * *